Sept. 30, 1924.
J. VON VASS
1,510,117
MOLDING HOLLOW BODIES
Filed July 27, 1920
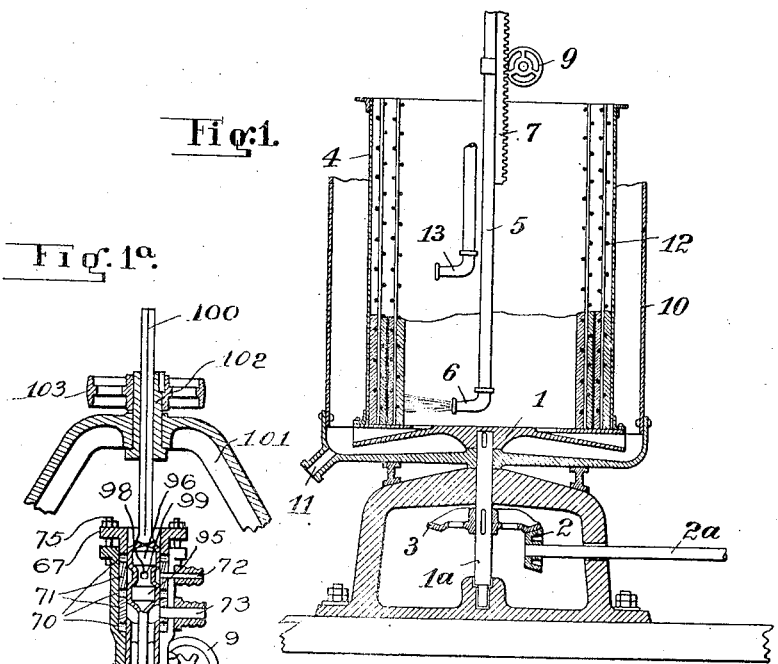
Fig. 1.
Fig. 1a.
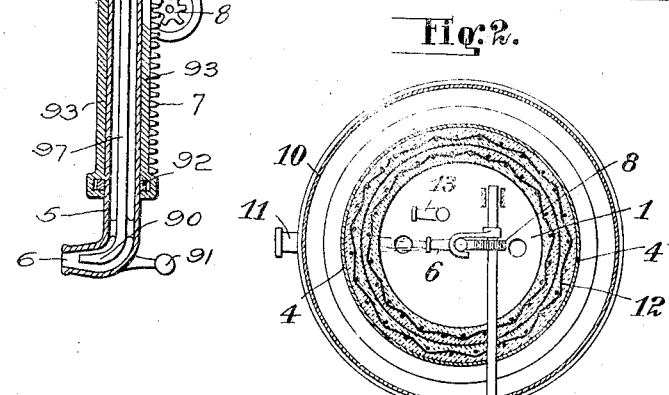
Fig. 2.
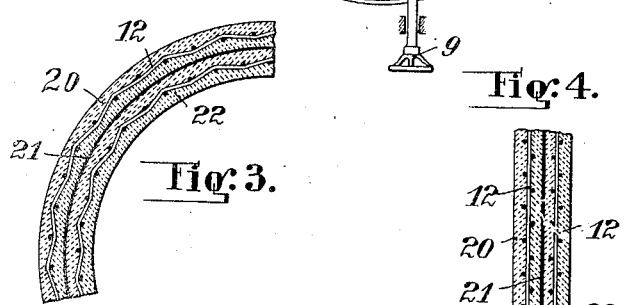
Fig. 3.
Fig. 4.
Inventor:
Josef von Vass
by ... Attorney.

Patented Sept. 30, 1924.

1,510,117

UNITED STATES PATENT OFFICE.

JOSEF von VASS, OF KOTZSCHENBRODA, GERMANY.

MOLDING HOLLOW BODIES.

Application filed July 27, 1920. Serial No. 399,435.

(GRANTED UNDER THE PROVISIONS OF THE ACT OF MARCH 3, 1921, 41 STAT. L., 1313.)

*To all whom it may concern:*

Be it known that I, JOSEF VON VASS, a citizen of the Hungarian Republic, residing at Kotzschenbroda, Germany, have invented certain new and useful Improvements in Molding Hollow Bodies (for which I have filed applications in Germany on August 13, 1918, No. 371,224, and April 10, 1920, No. 373,724), of which the following is a specification.

My invention refers to the method of making hollow bodies, and it relates more particularly to the production of hollow bodies such as for instance tubes and the like, from concrete and other plastic masses by blowing such material in a finely subdivided condition against the inner wall of a suitable model or mould. Experiments have shown that a concrete which, in some known manner, is carried to the place of usage under pressure and is here thrown against a model or the wall of a mould or the like after having been converted into spray by compressed air, is considerably harder and denser without special admixtures than a concrete prepared and handled in a different manner. The impermeability of objects produced by blowing in such a manner, is particularly remarkable and by far surpasses the impermeability of concrete shapes produced by hand.

I have now ascertained, that the remarkable qualities of blown concrete and of other similar plastic substances can still be enhanced very considerably in the manufacture of articles made of concrete and the like, and more especially in the manufacture of bodies of rotation, such as tubes, casks, tanks, floating bodies and others, if in accordance with the present invention the hollow bodies are produced by blowing the plastic substance on to a model rotating at high speed.

In carrying my novel process into practice I fix a model of a tube or the like, for instance, in a centrifugal machine and cause it to be rotated around its longitudinal axis with a corresponding speed, whilst from one or several nozzles concrete is blown on to the inner wall of the model, this blowing-on being preferably effected evenly by moving the nozzle in the direction of the longitudinal axis of the tube, this procedure being continued until the desired thickness of the walls of the tube is attained.

In the drawings affixed to this specification and forming part thereof, several modifications of a device for performing my novel method together with some articles produced by this method, are illustrated by way of example. In the drawings—

Fig. 1 is a sectional elevation and

Fig. 2 a horizonal section of a centrifugal molding machine.

Fig. 1ª is a vertical section of a modified form of spraying nozzle for use in connection with the device shown in Figs. 1 and 2.

Figs. 3 and 4 are, partial horizontal and vertical sections, respectively, of an armoured hollow body made according to my method and having an intermediate insulating layer.

Referring to Figs. 1 and 2, 1 is a disc fixed on the end of a shaft 1ª to which rotation is imparted by means of bevel gears 2 and 3. A mould 4 is fixed on disc 1. Within the mould there is disposed a pipe 5 having a nozzle 6 attached to its lower end and which may be displaced axially by means of a rack 7, a pinion 8 and hand wheel 9. The entire machine is surrounded by a casing 10 having a discharge pipe 11 arranged at the bottom. A second nozzle 13 may be provided for forming a layer of insulating material within or on the object.

When it is desired to produce a hollow body, the mould 4 is rotated at a suitable velocity, and the material of which the object is made,—such as concrete,—is blown onto its inner wall through pipe 5 and nozzle 6. At the same time, the pipe is moved up and down by actuating of hand wheel 9 so that the concrete is deposited on the wall of the mould in a helical curve. Iron rods, wire netting and the like may be inserted as indicated at 12.

In the modified form of nozzle illustrated in Fig. 1ª the concrete mixture is introduced at 73 into the nozzle 6 through tube 5, air under pressure entering at 72 through pipe 97, enclosed in tube 5, into the air nozzle 90. On escaping from nozzle 6, the concrete is mixed with air and impinges against the inner wall of the mould 4 (Fig. 1) in the form of a fine spray.

The nozzles are displaced axially and are set rotating in the following manner:

Nozzle 6, which is counterbalanced by a counterweight 91 fixed to it, forms the lower end of tube 5 carrying a ring 92 fixed to it and being surrounded by the lower end of a sleeve 93 which prevents tube 5 from moving longitudinally with relation to the sleeve, while allowing relative rotary movement. A rack 7 is formed on the sleeve and a pinion gearing with this rack can be turned by means of hand wheel 9 for lifting and lowering the sleeve, tube and nozzle. In the widened top portion of sleeve 93 there are arranged packing rings 70, 71 acted upon by a flanged ring 67 adapted to be depressed by screws 75. The three rings 70 cooperate with three cylindrical enlargements of the tubes 5 and 97, respectively, one at the top end of the tube 5 and two others (95, 96) formed on the tube 97 forming an extension of nozzle 90 and being connected by a contracted portion 99 having perforations 98. The air forced in at 72 passes through the contraction 99 into the cylinders 96, 95 and tube 97, while the concrete mixture is forced at 73 into the annular gap between tubes 5 and 97. The top end of cylinder 99 is fixed to the square rod 100 which is longitudinally movable in a square opening of a sleeve 102 mounted in the frame 101 and being set rotating, together with the nozzles, by means of pulley 103.

The objects produced in this manner, such as, for instance, tubes, are still harder and denser than those blown on a model standing still, for the blowing-on is assisted most effectively by the centrifugal action, inasmuch as the coarser material blown on in a spray in thin layers, is compelled by the effect of the centrifugal force to deposit itself evenly at the deepest point in the surface blown against, i. e. in a cavity or a hollow space, whilst simultaneously the binding matter with the fine-grained admixture is pressed into the hollow space and fills it completely. Only the surplus binding matter in which the further grains blown on embed themselves, remains on top.

In this process it is of particular importance that owing to the plastic substance being blown against the inside wall of the model rotating at high speed, even with the largest diameter and the smallest thickness of the wall of the hollow body produced, a decomposition of the material blown on and immediately pressed in by the centrifugal force, cannot take place inasmuch as it is laid on gradually and in layers in the desired place and, in the desired quantity and with a pressure which can be adjusted in every case. It is possible solely by this means of blowing on the plastic material in a rotating mold to unite the various processes which are important for the formation of the bodies such as pressing and depositing the mass densely and in layers, in a single operation.

If the impermeability of the walls of the tube with regard to water and gas is to be increased still further, a layer which is impermeable for water, such as a layer, of clay, tar, asphalt, or some other additional materials or mixtures thereof, is blown on to the concrete, or between an exterior and an interior layer of concrete, so that in the wall of concrete or upon the same an insulating layer is formed which constitutes an integral whole with the body. For this purpose the procedure is exactly the same as described above in the manufacture of the tubes, except that the second nozzle 13 (Fig. 1) is employed besides nozzle 6. From the one a certain concrete is blown so long, until, say, half the thickness of the wall is produced, then the second nozzle comes into action and blows on a material which is impermeable to water, whilst the first nozzle is turned off or also continues to work until the desired impermeable layer is attained, after which a layer of concrete alone is again blown on. A hollow body so made is illustrated in Figs. 3 and 4 in transverse and longitudinal section, respectively, where 12 are the parts forming the armour, 20 is the first layer of concrete 21 the insulating layer and 22 the second layer of concrete. The impermeable layer in this case therefore consists either only of a material impermeable to water, or of a mixture of it with the fundamental material.

Placing the impermeable layer in the interior of the wall of the body offers various important advantages. First of all the impermeable layer can be made very thin and is nevertheless capable of offering mechanical resistance, inasmuch as it is pressed in and cannot give way. It is, moreover protected against mechanical damages of every kind, which fact offers great advantages in transporting the object as well as in laying and using them.

Suitable additions may of course be admitted to the concrete, or metallic reinforcing structures may be inserted in the mold as is customary. Likewise, the layer which is impermeable to water, may also be laid on to the outside or inside surface, and this either with clearly defined limits or with scarcely noticeable transitions in every desired thickness and fineness.

The walls of the tubes, or of other circular bodies generally, may be produced from different substances according to this process, by laying the layers of the different substances one on top of the other in the desired thickness by blowing on. In this manner it is possible to produce, for instance, iron-mounted hollow columns, the outer layer of which consists of valuable material, whilst the remainder of the wall is made from ordinary concrete, or furthermore dense concrete tubes, which, according to their purpose of employment, may be covered on the outside or the inside with composite wood pulp, paper stock, a layer of cork, or other suitable material.

The advantages of the process consist not only in the extraordinary density and strength of the bodies which makes them suitable, in consideration of their impermeability to water and gas, to replace the expensive iron tubes, but also in the quick and easy manner of manufacture which makes it possible that unskilled labourers could produce a faultless tube in the usual constructional length and of a diameter of 800 mm. without difficulty in about 15 minutes. As with the novel process the diameter of the circular body to be produced can be very large, provided that a corresponding plant be erected, and as, in the case of large diameters, ribs and webs, and more especially transverse ribs, can be blown and produced simultaneously with the wall without further trouble the process is eminently suited for producing large hollow bodies such as, for instance hulls of ships or other hollow bodies capable of floating and closed on all sides. The double metallic or other mountings are inserted in the mould and fastened there, it being possible also to close the two ends of the mould either by pieces formed of concrete and set previously, or by boarding formed accordingly, and layers impermeable to water may likewise be inserted in the wall between two or more other layers either with clearly defined limits or mixed with the fundamental material, or else, the wall may be formed of different materials laid on layers one on top of the other. The transverse ribs of the body formed, may be produced in the boardings inserted in the mould which rotates rapidly simultaneously with the thin wall, by the nozzle being caused to move slowly, in the direction of the longitudinal axis of the body, where the ribs shall form or being even brought to a standstill. The longitudinal ribs, as, for instance, the keelson and the like, may be blown on in between boardings immediately after the production of the main body, so that an intimate connection between the freshly produced wall and the transverse ribs ensues by means of the concrete which has not yet set, because the centrifugal treatment of the concrete only requires a short time, so that the concrete, already pressed, it is true, by the effect of the centrifugal action and also rammed by the blowing on, will already have received its form, but still not yet have set.

The novel process offers a surprisingly favorable possibility of manufacturing on a big scale large floating bodies from reinforced concrete with thin walls, great strength, extraordinarily high impermeability against water, short building terms and inexpensiveness, without waste of material.

Several such hollow floating bodies may be arranged beside one another and provided with a common bottom and side-walls, and, thus divided into bulkheads, form the cheapest ships and rafts; individual hollow bodies, if designed correspondingly, may in themselves be employed as hulls of ships, if they are provided with appropriate hatchways. The individual bodies are particularly suitably employed as pontoons, for instance, for building pontoon bridges, bathing-establishments, and the like.

According to my novel process it is further possible to manufacture without the least difficulty annular hollow bodies of a diameter say, for example, of 4 meters which, annuli, by means of longitudinal ribs blown on or by means of their iron mountings which penetrate into one another, may be connected together so as to form floating bodies of any desired length.

Finally the process may be employed not only for the manufacture of circular hollow bodies, but just as well also for the manufacture of nearly completely solid bodies with an inner hollow space of circular cross-section, such as rollers, millstones, grind-stones, and other similar objects, in which the deposition of various materials in layers one above the other, or a great strength is desired.

A further modification of the process according to the present invention and which can be employed with particular advantage in all the different instances of application indicated, consists in imparting to the nozzle, besides its movement in the longitudinal axis of the body, also a rotary motion around the axis of the body, so that the nozzle will deposit the material on the working surface whose motion the said nozzle follows with slower or faster progress, and, corresponding to the purpose, in thinner or thicker layers, strictly according to the difference in the speeds of rotation between the centrifugal machine and the nozzle. The laying on of the material will consequently proceed in the same way as in the case of a working surface standing still with the nozzle being shifted slowly. The direction of rotation of the nozzle will in most cases be the same as that of the centrifugal molding machine.

As, however, the centrifugal machine, in order to fulfill its purpose, is rotated at a high speed, the nozzle must also be rotated with considerable velocity and as the result, i. e. the progress on the working surface, is only dependent on the difference in the speeds of rotation without considering whether the nozzle leads or lags, it is advantageous to make the speed of rotation of the nozzle higher than that of the centrifugal machine.

If, however, the nozzle rotates at a high speed, it will itself work as a centrifugal machine which throws the material fed to it against the working surface, in this case against the inner surface of the mould rotated at a high speed, thereby considerably facilitating the laying on of the material and making it possible to work with a small amount of compressed air even when using material containing large fragments, such as, for instance, broken stones which demand a large opening of the nozzle as the ejection of the material is materially assisted by the centrifugal force, and the compressed air supplied mainly has to perform the work of transforming into spraying and of shaping and keeping together the jet.

The manner of application of the process may be widely varied without the special characteristics of the invention thereby being altered or restricted. Thus for instance a plurality of nozzles may be arranged over one another or following upon one another either on one common shaft or on several shafts inserted in one another, the said nozzles being supplied with different materials or with the various mortar-forming substances which then meet either on the surface or before or after escaping from the nozzles, when they are mixed and thereupon form the mortar or the desired body respectively.

The feeding of the material to the nozzles may be effected in various manners, such as for instance by means of conveyor worms, chain pumps, flexible pipes and the like. It is however of advantage, if the nozzles are attached to the larger circumference of a hollow body shaped as the frustum of a cone and rotated at a high speed, because then the material fed in through the smaller diameter, is forced kinematically towards the larger circumference and into the nozzles provided there, respectively.

The direction of rotation of the nozzle is mostly the same as that of the mould in the centrifugal machine; it may, however, appear advantageous, in many cases to make the nozzle rotate in the opposite direction for instance, in the case of plastic masses or in cases where an increased ramming action is desirable.

It stands to reason that, if the nozzles rotate at a very high speed, the centrifugal force alone also suffices to eject the material fed in, and to hurl it against the model or mould rotating at a high speed, so that in this case the supplying of compressed air for the purpose of spraying and blowing the material against the working surface can also be dispensed with entirely.

I wish it to be understood that I do not desire to be limited to the exact details of construction shown and described, for obvious modifications will occur to a person skilled in the art.

I claim:

1. The method of making hollow bodies from plastic material, such as for instance concrete, comprising spraying a plastic mixture containing such material onto the inner wall of a mould rotating at comparatively high speed.

2. The method which consists in spraying a mixture of different plastic materials onto the inner wall of a rapidly rotating mould.

3. The method which consists in spraying different plastic materials, one after the other, onto the inner wall of a rapidly rotating mould.

4. The method which consists in spraying onto the inner wall of a rapidly rotating mould a plastic material, thereafter a material impermeable to water, and thereafter again plastic material.

5. The method which consists in spraying plastic material onto the inner wall of a rapidly rotating mould so as to form a hollow body and forming on the inner wall of said body a reinforcement by spraying further plastic material onto a portion of said hollow body.

6. The method which consists in forming ribs on the inner wall of a rotary mould and thereafter spraying onto said wall and ribs plastic material while said mould is rapidly rotating.

7. The method which consists in imparting to a jet of plastic material within a rapidly rotating mould a motion in the direction of the axis of rotation.

8. The method which consists in imparting to a jet of plastic material within a rapidly rotating mould both a motion of rotation about the axis of rotation of said mould and a motion in the direction of said axis.

9. The method which consists in imparting to a jet of plastic material within a rotating mould both a motion of rotation about the axis of rotation of said mould and a motion in the direction of said axis, said jet and said mould rotating with different velocities.

10. The method which consists in imparting to a jet of plastic material within a rotating mould both a motion of rotation about the axis of rotation of said mould and a motion in the direction of said axis, said jet and said mould rotating with different velocities, and in different directions.

11. The method which consists in imparting to a plurality of jets of plastic material within a rapidly rotating mould both a motion of rotation about the axis of rotation of said mould and a motion in the direction of said axis.

12. The method which consists in imparting to a plurality of jets of plastic and nonplastic material within a rapidly rotating mould both a motion of rotation about the axis of rotation of said mould and a motion in the direction of said axis.

13. The method which consists in imparting to a plurality of jets of plastic material within a rotating mould both a motion of rotation about the axis of rotation of said mould and a motion in the direction of said axis, said jets and said mould rotating with different velocities.

14. The method which consists in spraying against the inner wall of a rotating mould a plastic material at the same time directing a jet of a different material against said wall and imparting to both jets both a motion of rotation about the axis of rotation of said mould and a motion in the direction of said axis, the said mould and said jets rotating with different velocities.

In testimony whereof I affix my signature.

JOSEF von VASS.